(12) United States Patent
Van Dyke et al.

(10) Patent No.: US 7,310,260 B2
(45) Date of Patent: Dec. 18, 2007

(54) HIGH PERFORMANCE REGISTER ACCESSES

(75) Inventors: Phil Van Dyke, Surrey (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 374 days.

(21) Appl. No.: 11/087,838

(22) Filed: Mar. 23, 2005

(65) Prior Publication Data

US 2006/0218307 A1   Sep. 28, 2006

(51) Int. Cl.
*G11C 19/08* (2006.01)

(52) U.S. Cl. .................... 365/78; 365/189.04

(58) Field of Classification Search ............ 365/78, 365/189.04
See application file for complete search history.

(56) References Cited

U.S. PATENT DOCUMENTS

| | | | |
|---|---|---|---|
| 4,172,281 A | 10/1979 | Gordon | |
| 4,769,767 A * | 9/1988 | Hilbrink | ............ 365/174 |
| 5,126,975 A * | 6/1992 | Handy et al. | ...... 365/230.01 |
| 5,509,138 A | 4/1996 | Cash et al. | |
| 5,721,860 A | 2/1998 | Stolt et al. | |
| 5,737,765 A | 4/1998 | Shigeeda | |
| 6,226,724 B1 | 5/2001 | Biggs | |
| 2004/0128405 A1* | 7/2004 | Fujita et al. | ............ 710/20 |

* cited by examiner

*Primary Examiner*—Thong Q. Le
(74) *Attorney, Agent, or Firm*—Rosalio Haro

(57) ABSTRACT

The use of a bus clock is eliminated in communication between a cpu, or mpu, and a register block. The communication between the cpu/mpu and the register block is made combinatorial, such that the cpu/mpu does not require any acknowledge or wait signal from the register block to know when to proceed with a requested write operation. The register block has both a write request input and a read request input, each of which is separately actuated to initiate a write operation or read operation, respectively. The cpu/mpu initiates a write operation by actuating the write request input while maintaining the read request input negated. The register block responds to actuation of its write request input by getting ready for initiate the requested write operation, and waiting for a signal letting it know if the requested operation is a valid write operation. If the requested write operation is deemed valid, then the register block executes the requested write operation only upon the negation of the write request. Since the write request signal is controlled by the cpu/mpu, the entire write operation is completed within one cpu/mpu operational cycle.

21 Claims, 10 Drawing Sheets

HIGH PERFORMANCE REGISTER ACCESSES

BACKGROUND OF THE INVENTION

1. Field of the Invention

The present invention relates generally to a register access method, and structure. Specifically, the present invention relates to a register access architecture that does not require use of a bus clock signal to synchronize its operation to a cpu/mpu unit.

2. Description of the Related Art

Typically, accessing a register block on a cpu or mpu bus requires a bus clock to synchronize the register block with the cpu/mpu. The bus clock, which is typically provided by the cpu/mpu and whose cycle period is thus equivalent to a cpu/mpu operation cycle, is also needed to allocate additional time in predetermined clock cycle increments to the register block, which typically requires more time than is provided by one bus clock cycle (i.e. one operation cycle of the cpu/mpu) to implement a write, or read, operation.

Various method of synchronizing a register block, or memory block, to the cpu/mpu operation cycle are known. In one implementation, the cpu/mpu may issue a memory request signal to the register block, along with the request for a read or write operation. The cpu/mpu then monitors its bus until the register block responds with an acknowledge signal letting the cpu/mpu know that the register block is ready to proceed with the requested operation. The register block typically requires multiple bus clock cycles before responding with the acknowledge signal. In this case, the amount of bus clock cycles that the cpu/mpu is made to wait is indefinite.

In an alternate approach, a wait line is used to notify the cpu/mpu that the requested read or write operation cannot be implemented yet. The cpu/mpu does not know how long the wait time will be, and must therefore constantly monitor the wait line to determine when it may stop waiting and proceed with the requested operation.

As it is known, the bus includes multiple control lines carrying various signals, including a chip select signal on a first line and a read/write command signal on a second line, which is typically set to a logic high to indicate a read operation request and set to a logic low to indicate a write operation request. Typically, the register block monitors these two bus control lines, and when the chip select signal is sampled as active, the command signal (read or write) is sampled to determine if the current cycle is a read cycle or write cycle. The register block then asserts a wait signal on the wait line to let the cpu/mpu know when it may accept data or provide data. The wait signal is issued for an indefinite time, as deemed necessary by the register block.

Typically, the cpu/mpu samples the wait signal from the register block at predetermined times during each subsequent bus clock cycle until the wait signal is negated. In essence, the wait signal lets the cpu/mpu know when the register block can accept data (for a write operation) or provide data (for a read operation), and thereby effectively lengthen the operation cycle until the register block can finish processing the requested data transfer. Generally, once the cpu/mpu samples the wait signal as inactive, i.e. negated, it can then finish the write/read operation cycle during the next bus clock cycle by de-asserting the chip select signal and/or the command signal.

Thus, the cpu/mpu and register block typically follow a request-and-respond sequence to transfer data between themselves. This results in lower than optimal data transfer rate since each data transfer sequence requires multiple bus cycles. Additionally, the cpu/mpu must allocate resources to monitoring its bus for an appropriate wait response from the register block.

OBJECTS OF THE INVENTION

It is an object of the present invention to provide a register for communication with a cpu/mpu without the need for a bus clock signal.

It is another object of the present invention to provide. a register with an improved data transfer efficiency between itself and a cpu/mpu.

SUMMARY OF THE INVENTION

The above objects are achieved in a structure and method for reading and writing directly to a register block of a device on a CPU or MPU bus. This results in a high performance register access scheme that does not require a bus clock, which is typically needed to access devices on a bus. The present structure further simplifies the interface between a register block device and a cpu, or mpu, host by permitting cpu/mpu signals to be used directly by the device and not requiring sampling in accordance with a clock.

In one implementation, the data register includes separate write select and read select inputs, for respectively requesting a write or read operation. It is to be understood that a common read/write line my also be used. Preferably, the data register follows a two stage operation wherein the cpu/mpu lets the data register know at the beginning of a cpu/mpu bus cycle what type of operation is desired, and executed (i.e. finishes) the requested operation at the end of the cpu/mpu bus cycle. This permits the register block a maximum amount of time for completion of any preparatory steps, such as allowing time for valid data to become available.

For example to execute a write operation, the cpu/mpu initiates the write operation by issuing a write select signal to the register block, while maintain the read select signal negated. After the register block has been selected and actuate, and it has recognized the requested operation, the register block waits for negation of the write select signal. Upon negation of the write select signal, the register responds by latching in any data at its data input nodes.

Alternatively, the register block additionally includes a write valid input. After the cpu/mpu has initiated a write operation by issuing the write select signal and has specified an address to which to write, a decode circuit, which monitors the cpu/mpu bus, make a decision as to whether the current write request constitutes a valid write operation. If the decode circuit deems the current operation to be a valid write operation, it will actuate the register block's write valid input. The register block would have previously received the write select input from the cpu/mpu letting it know that a write operation is being requested, but the register block preferably does not execute the requested write operation until signaled to do so by the write valid signal.

Further preferably, the register block is not signaled to execute the write operation until the end of the cpu/mpu's current operation cycle (i.e. bus cycle). The write valid signal is negated at the end of the current bus cycle, and the register block therefore preferably responds to negation of the write valid signal by executing the write operation requested at the beginning of the bus cycle. Alternatively, the register block may execute the requested write operation upon the negation of the write select signal from the cpu/ mpu. In essence, the register block does not executed the requested write operation until the cpu/mpu ceases requesting the write operation.

In this manner, the cpu/mpu does not need to wait for any response from the register block to know when the requested write operation will be executed. The cpu itself dictates the execution of the write operation because the write operation follows a combinational logic sequence. This permit the write operation to be executed within one cpu/mpu bus cycle.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

The present invention outlines a method for reading and writing directly to a register block of a device on a CPU or MPU bus without using a bus clock or necessitating a request for wait states. That is, the present high performance register access scheme does not require a bus clock, such as is typically needed to access devices on a bus.

Figure 1:
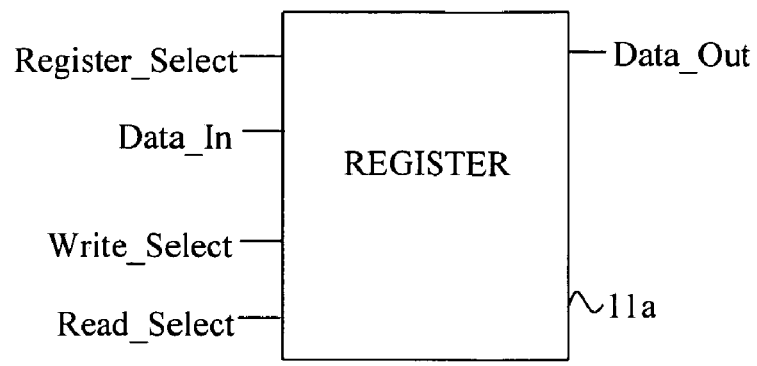
FIG. 1 is a register in accord with the present invention.

With reference to FIG. 1, a first embodiment of a data register 11a in accord with the present invention preferably has a Data_In input for writing dating into register 11a, a Write_Select input to select a write operation, a Read_Select Input to select a read operation, and a Data_Out output for reading out from register 11a. A Register_Select and/or Chip_Select input may also be used to provide a convenient method for selecting a specific one of multiple registers 11a. The structure of FIG. 1 shows a one-bit register 11a, but it can easily be expanded to show an 8, 16, or 32 bit register by placing multiple registers 11a in parallel, or providing additional Data_In inputs and Data_out outputs to register 11a, as is explained more fully below. Operation of register 11a is best understood with reference to the timing diagrams of FIGS. 2 and 3.

In the following discussion, all cpu/mpu signals are assumed to be active low. It is to be understood that this is merely a design preference and the present invention is equally suitable for active high applications with minimal modifications, all of which are considered to be within the realm of one versed in art.

Figure 2:
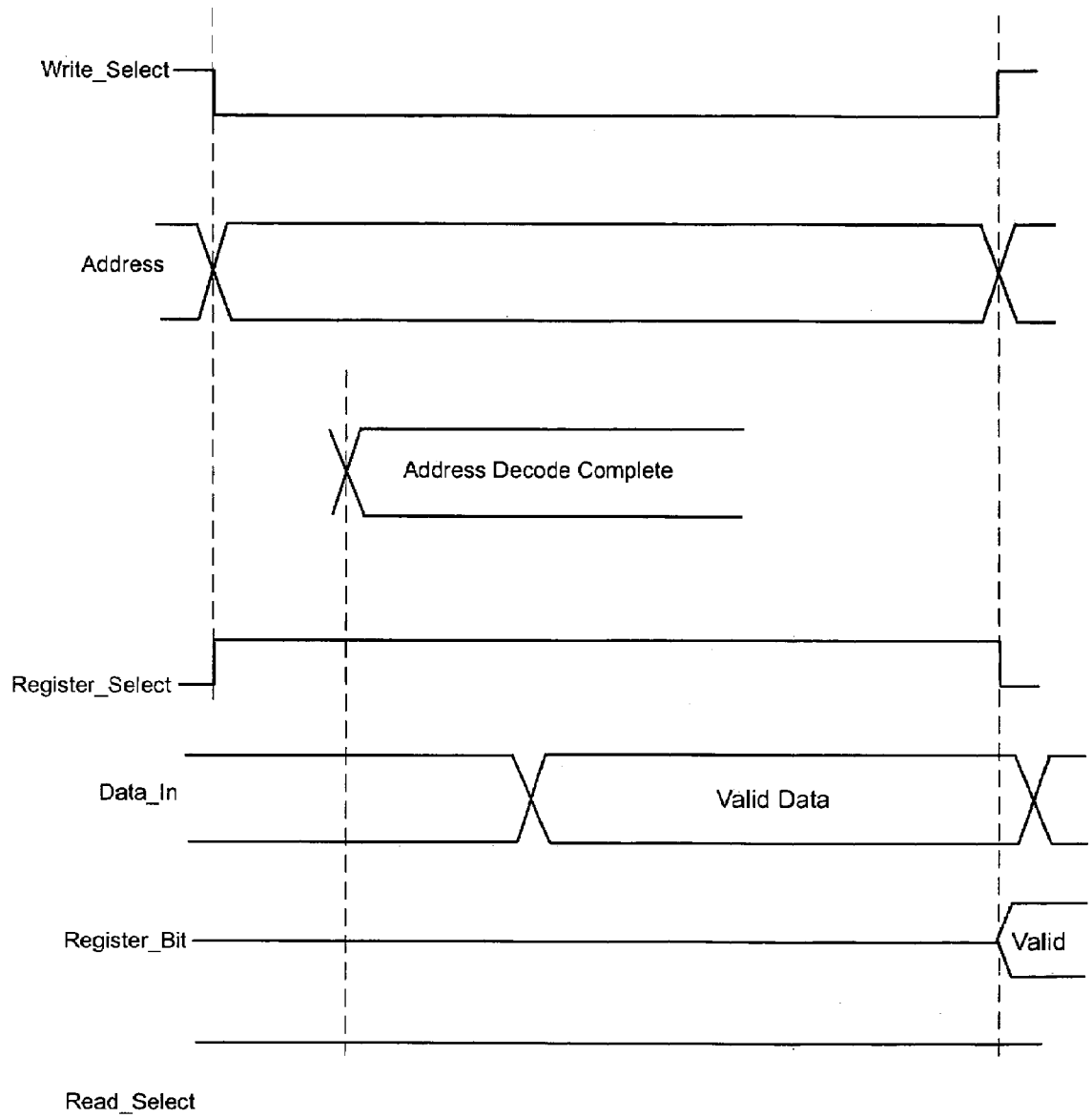
FIG. 2 is a timing diagram for a write operation in accordance with the register of FIG. 1

With reference to FIG. 2, a write operation begins when a cpu/mpu causes the Write_Select input to be asserted low while the Read_Select input remains unasserted, i.e. high. It is to be understood that if a plurality of registers 11a, or a plurality of register banks each having multiple registers 11a, were to be used, an address decoder may be used to individually select a targeted, i.e. specifically selected, register 11a, as is explained in more fully below.

In essence, the write operation follows a two-step process; i.e. a get ready step followed by an action (or execution) step. By responding to a get-ready-to-write signal prior to actually executing the action of latching in and storing an input data bit, register 11a is given more time to execute a write operation during a current bus cycle and can thus eliminate the need for wait states. That is, register 11a is signaled early in the bus cycle that a write operation is in progress, but it is not signaled to actually latch-in data to be written until the end of the current bus cycle.

Essentially, signal Write_Select acts as the get-ready-to-write signal letting register 11a know that it will be called upon to execute a write operation sometime toward the end of the current cycle. This allows more time for a data bit at its Data_In input to become stable and for any required logic processing steps to be completed.

Following, or concurrently with, actuation of signal Write_Select, signal. Register_Select, which is active high, is raised and thereby asserted. For the sake of completeness, the timing diagram of FIG. 2 shows the issuance of an address, presumably from the cpu/mpu, used for selecting register 11a among a plurality of other registers. Decoding the issued address requires some finite amount of time, and its decoding is made to assure that the desired address is within an allowed memory space and to singularly identify register 11a. This is useful in determining if a current write or read operation is valid, as is explained more fully below.

With signals Register_Selectand Write_Select actuated, register 11a continues to ignore its Data_In input. Indeed, valid data may not be present at input Data_In until later in the current operation cycle, as noted in FIG. 2. Since signal Write_Select is actuated, register 11a begins to prepare for accepting data at its Data_In input, but does not actually capture, i.e. latch in, any data at this time. In essence, signal Register_Select may be thought of as a general "get ready" signal to alert register 11a to prepare for some type of operation (i.e. read or write), but does not trigger actuation of a data latch-in (i.e. write) or data output (i.e. read) operation. Inputs Write_Select and Read_Select let register 11a know whether it will be expected to actuate a read or write operation at the end of the current cpu/mpu cycle. In the present case since signal Write_Select is actuate (i.e. brought low) and signal Read_Select is not actuated (i.e. remains high), register 11a is let know to observe signal Write_Select, which will be later used to trigger a data latch-in phase of the write operation.

In this get-ready mode of operation, register 11a does not capture any data until signal Write_Select is removed, i.e. negated, which also signals the end of the current access cycle. By postponing the actuation of a write or read operation until the end of the current cycle, time is provided to assure that the correct register is selected, as determined by signal Register_Select and issued address, and to assure that valid data is made ready at its Data_In input and Data_Out output, as appropriate. Since in the present example signal Write_Select is assumed to be an active-low signal, register 11*a* responds to signal Write_Select going high (i.e. being de-actuated, or negated) by latching in any data value at its Data_In input, as indicated by the Valid data bit label on line "Register Bit" in FIG. 2. Thus, the data bit is written to the register at the end of the cpu/mpu cycle, as indicated by signal Write_Select going high.

In the present application, it is assumed that register 11*a* is in direct communication with a cpu/mpu unit, not shown, and register 11*a* does not accept input data until the end of the cpu/mpu cycle, as determined by signal Write_Select going high. In this manner, memory register 11*a* is permitted the maximum time, as determined by the cpu/mpu cycle, for valid stable data to become available at its Data_In input and for preparing to accept the new data bit. Since signal Write_Select is controlled by the cpu/mpu, register 11*a* is made to operate at the cpu's/mpu's bus cycle speed. Additionally, no bus clock is needed since the interaction between register 11*a* and the cpu/mpu is in the form of combinational logic.

Figure 4:
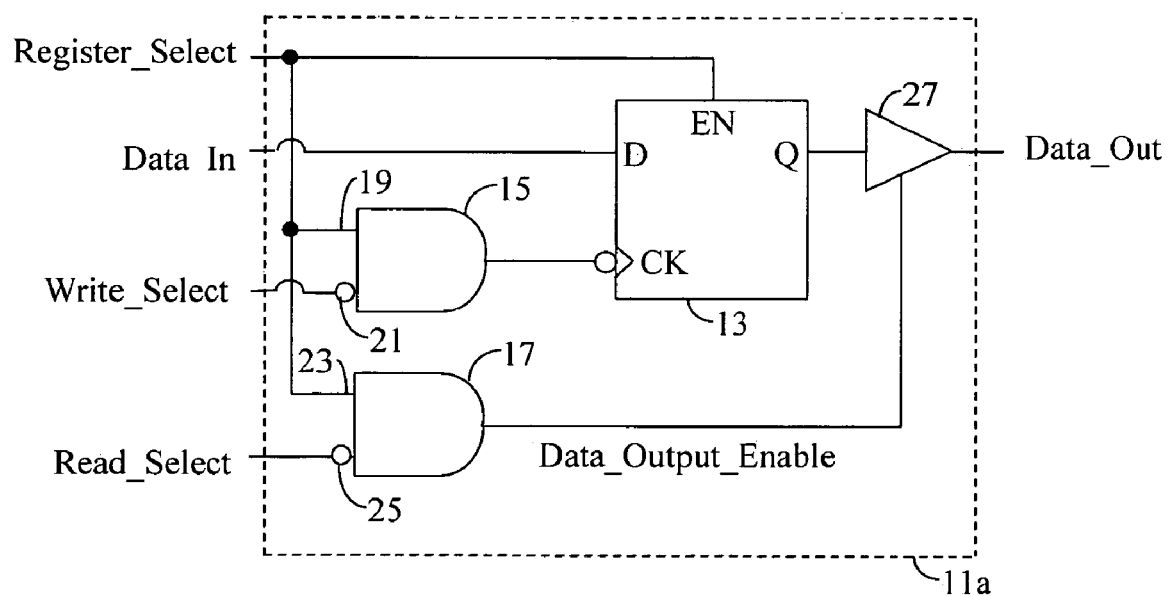
FIG. 4 is an internal view of the register of FIG. 1.

With reference to FIG. 4, an internal view of register 11*a* includes a data latch 13 (i.e. preferably a D-type flip-lop) and logic circuitry (including a first two-input AND gate 15 and a second two-input AND gate). Preferably, AND gate 15 has an active-high input 19 responsive to the Regsiter_Select input and an active-low input 21 response to the Write_Select input. In this way, AND gate 15 acts as a mask for blocking signal Write_Select whenever signal Register_Select is not actuated. Similarly, AND gate 17 has an active high input 23 responsive to input Register_Select for masking signal Read_Select at its active low input 25 whenever signal Register_Select is not actuated. Data latch 13 preferably has an enable input EN responsive to signal Register_Select, a data input D coupled to the Data_In input, a negative-edge triggered clock input CK, and a data output Q.

The output of AND gate 15 goes high when signal Register_Select is high and signal Write_Select is low. In this case, the output of AND gate 15 remains high until either signal Write_Select is brought high (i.e. de-actuated) or signal Register_Select is brought low (i.e. de-actuated). In response to removal of signal Write_Select, the output of AND gate 15 transitions from high to low and thereby triggers the negative-edge clock input CK of data latch 13 causing data latch 13 to latch-in any data bit at its data input D.

When enabled by signal Register_Select, data latch 13 continuously outputs its stored data information at its output Q. However, the information on output Q is conditionally transferred to output Data_Out only during a read operation via a tri-state buffer 27, which is responsive to signal Data_Output_Enable issued from the output of AND gate 17.

Figure 3:
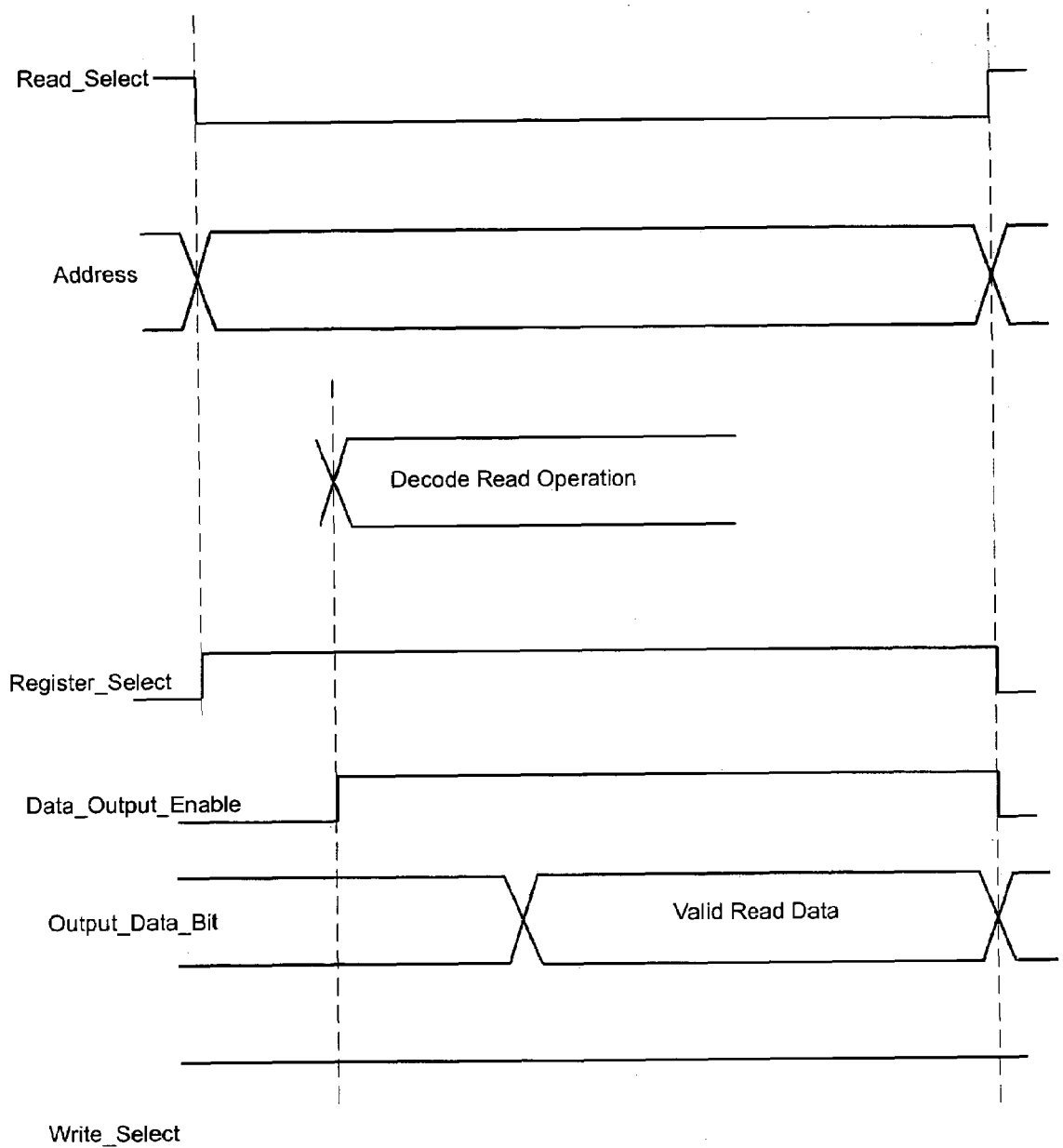
FIG. 3 is a timing diagram for a read operation in accord with the register of FIG. 1.

As shown in FIG. 3, a read operation begins by bringing low input Read_Select while maintain input Write_Select high. The Register_Select input is also brought high, and the issued address is resolved sometime later. Since input Write_Select remains low during the entire read cycle, the output of AND gate 15 of FIG. 4 remains low and can therefore not trigger the clock input CK of data latch 13. However, AND gate 17 responds to the rising of the Register_Select input by signaling tri-state buffer 27 to couple output Q from data latch 13 to the Data_Out output of register 11*a*. Thus, a valid Output_Data_Bit is placed on the Data_Out output comparatively early in the read cycle, and this data value remains valid until the cpu/mpu removes signal Read_Select.

In this manner, register 11*a* is made to provide a valid data output for most of the cpu/mpu cycle during a read operation. Conversely during a write operation, register 11*a* is provided with as much time as possible, as limited by the cpu/mpu bus cycle, to acquire new valid data.

Figure 5:
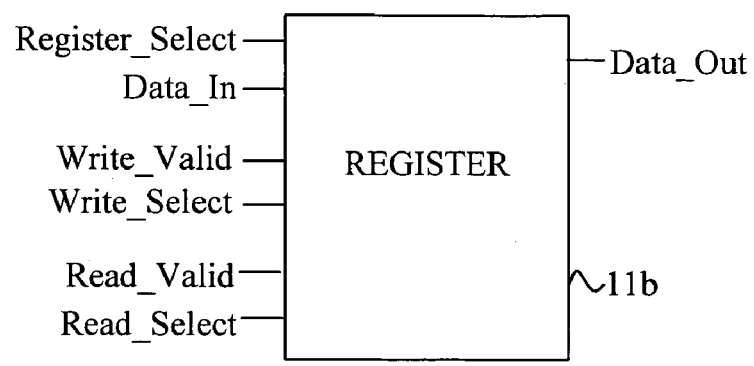
FIG. 5 is a register in accord with an alternate embodiment of the present invention.

With reference to FIG. 5, a second embodiment of a data register 11*b* in accord with the present invention, and better suited for direct combinatorial communication with a cpu/mpu preferably has two additional inputs. All elements similar to those of FIG. 1 are identified by similar reference characters and are described above.

Like in the previous case of FIG. 1, data registers 11*b* of FIG. 5 has a Register_Select input, a Data_In input, a Write_Select input, a Read_Select input, and a Data_Out output. However, data registers 11*b* additionally has a Write_Valid input and a Read_Valid input, which let data register 11*b* know when a valid read cycle or a valid write cycle is in progress, and which trigger an actual read or write operation. Basically, inputs Write_Select and Read_Select function as "get ready" signals letting register 11*b* know what type of operation will be expected of it, but register 11*b* will not initiate the requested operation, i.e. write or read operation, until instructed to so by the Write_Valid or Read_Valid inputs, as appropriate.

Figure 6:
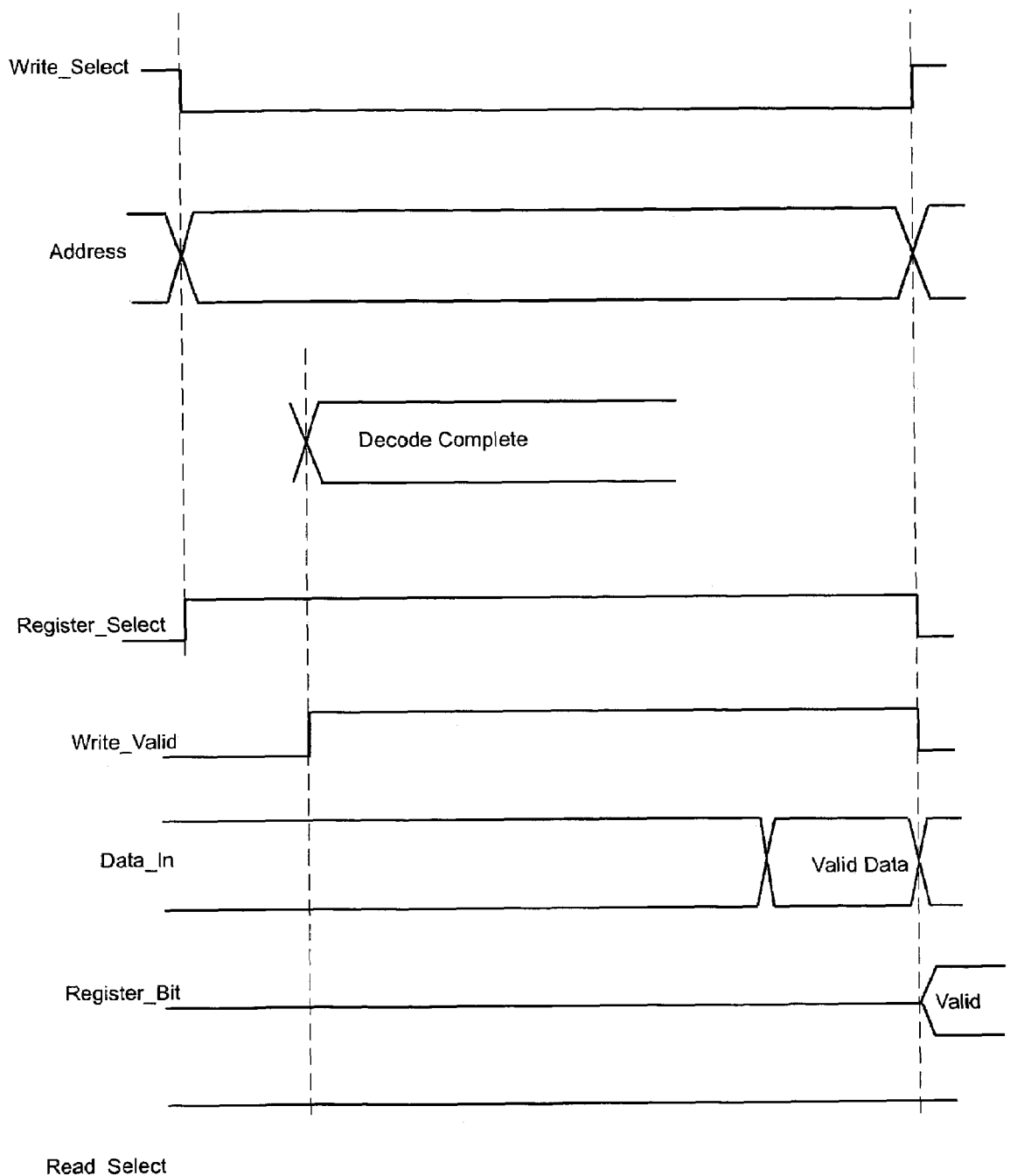
FIG. 6 is a timing diagram for a write operation in accordance with the register of FIG. 5

Operation of data register 11*b* is better understood with reference to the timing diagram of FIG. 6, which describes a timing sequence for a write operation. Although not shown in FIG. 5, for the sake of completeness, the timing diagram of FIG. 6 shows decode timing that would typically be implemented by decode circuitry monitoring the bus interfacing register 11*a* with a cpu/mpu. By observing the control lines on the bus interfacing data register 11*b* with a cpu/mpu, the decode circuitry can determine if a valid write operation is being executed. The validity of the write operation can depend, for example, on determination of whether a targeted address lies within the address space encompassed by all data registers 11*b*, or determined by observation of the sequence of actuated control signals, etc.

The write cycle begins with actuations of signal Write_Select, which is preferably an active-low input. Presumably, data register 11*b* is part of a group of data registers, each identified by a different memory address. Therefore, the timing diagram of FIG. 6 shows the issuance of address line. For the sake of simplicity, the address decoding time is not shown but is assumed to be similar to the decode time shown. A small delay thus exists from the time the input address is received to the time that an address decode operation is complete.

If the decode circuitry determines that the write operation is valid, then the decode circuitry actuates the Valid_Write input, preferably by being brought to a high logic level. The Write_Select input is preferably under direct control of the cpu/mpu and assertion of the Write_Valid input is made by observing bus lines under cpu/mpu control. Thus, either Write_Select or Write_Valid may be observed to determine the end of the cpu/mpu's write cycle. When either the Write_Select input or the Write_Valid input is removed, register 11*b* responds by latching in the data bit at its Data_In input. By not latching in data until the end of the cpu/mpu's cycle, as much time as possible is provided to permit register 11*b* to properly complete the write operation.

Figure 7:
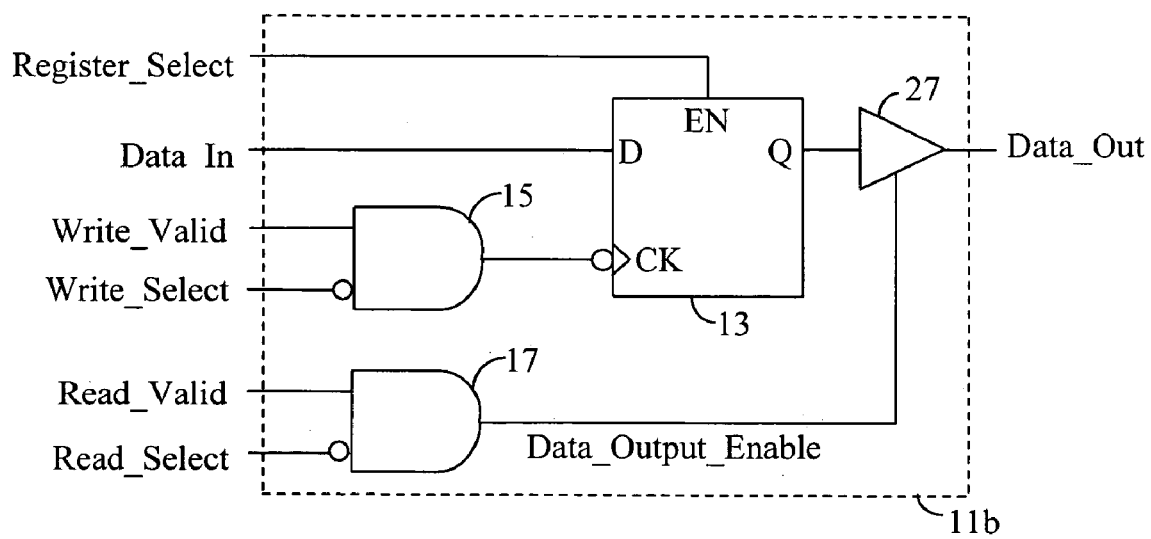
FIG. 7 is an internal view of the register of FIG. 5.

With reference to FIG. 7, all elements of the internal block diagram of register 11*b* similar to those of FIG. 4 are identified with similar reference characters and are described above. Like in the previous case of FIG. 4, the Data_in input is applied to the D input of latch 13, and the Q output of latch 13 is coupled to Data_Out via tri-state buffer 27, which is responsive to control line Data_Output_Enable from AND gate 17. Also like in the previous case, the Write_Select input is applied to the active-low input of AND gate 15, and the Read_Select input is applied to the active-low input of AND gate 17. However in present case, the Write_Valid input is applied to the active-high input of AND gate 15, and the Read_Valid input is applied to the active-high input of AND gate 17. The Register_Select input is applied to the enable input EN of D latch 13.

Figure 8:
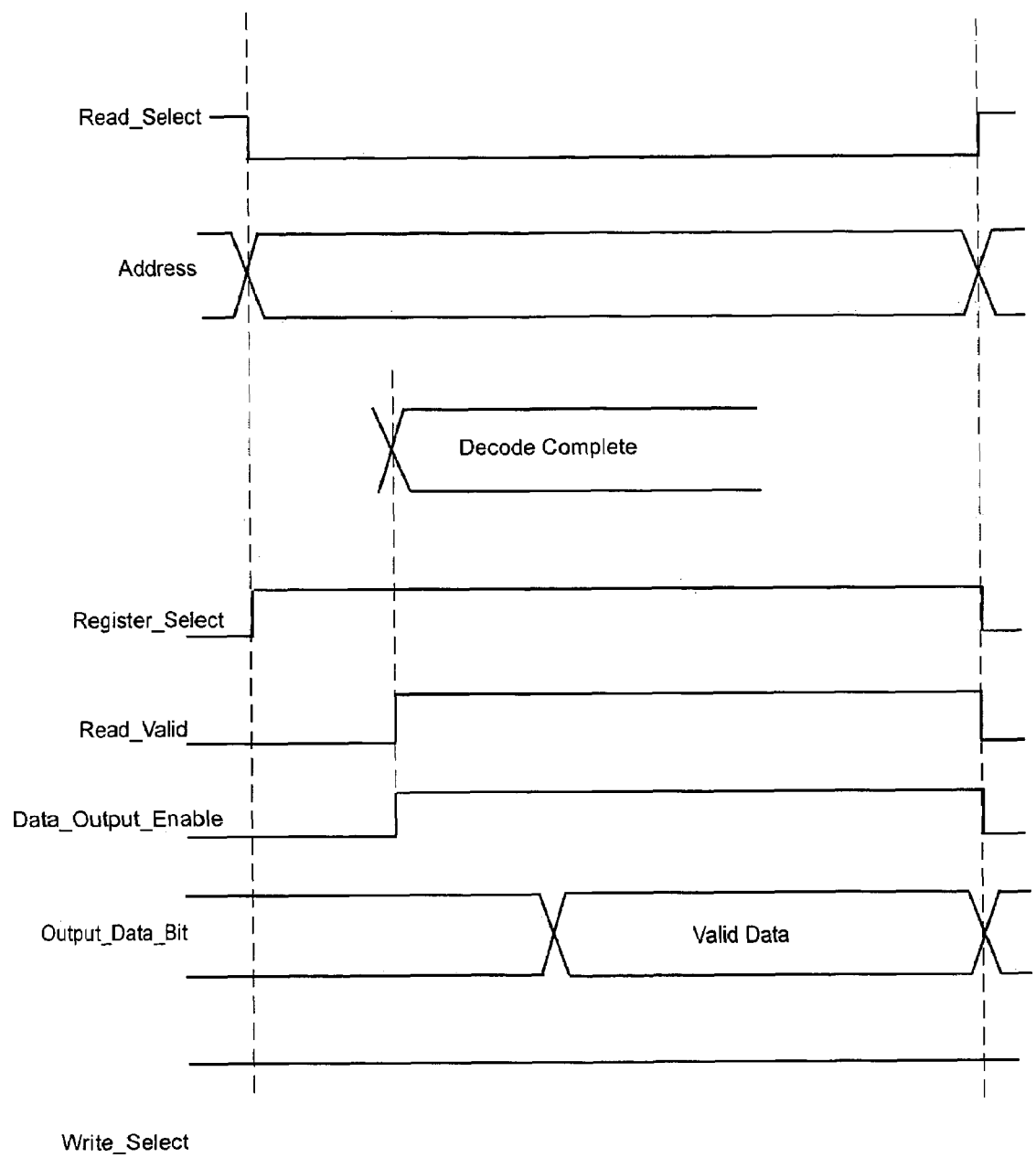
FIG. 8 is a timing diagram for a read operation in accord with the register of FIG. 5.

With reference to FIG. 8, a read operation of register 11$b$ starts with actuation of the Read_Select input. Like in the previous case of the write operation of FIG. 6, it is assumed that an input address targeting a specific register 11$b$ is submitted and some time is required for an address decoder, not shown, to complete an address decode operation and to identify the targeted register 11$b$. Once the address is resolved, the targeted register 11$b$ receives a Register_Select input. By this time, register 11$b$ already knows that it is expected to execute a read operation since input Read_Select was applied earlier. Also like in the previous case, a decode circuit, not shown, observes the bus interfacing register 11$b$ with a cpu/mpu and makes a determination of whether the read cycle is valid in a manner similar that of FIG. 6. If the read cycle is determined to be valid, signal Read_Valid is actuated, and internal control signal Data_Out_Enable is issued causing tri-state buffer 27 to transfer the data output Q onto the Data_Out output.

Figure 9:
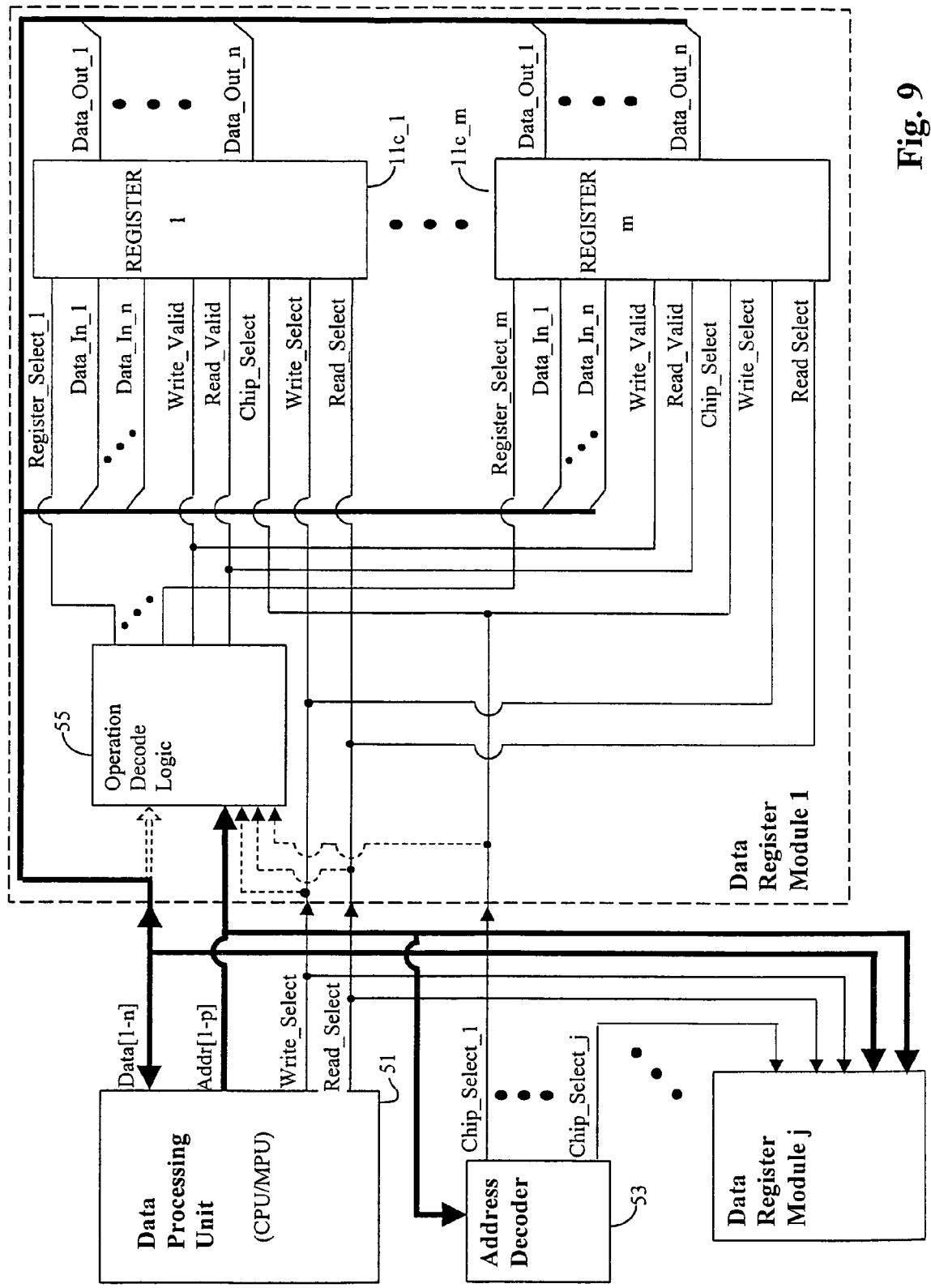
FIG. 9 is a block diagram of a system using a register in a accord with a third embodiment of the present invention.

With reference to FIG. 9, a block diagram of a plurality of data register modules 1 through j in accord with the present invention are shown interfaced with a data processing unit, i.e. cpu/mpu unit 51, on a local bus including data lines Data[1-n], address lines Addr[1-p], and control lines Write_Select and Read_Select. Each Data Register Module 1 through j is identified by a different address, and cpu/mpu 51 targets a specific Data Register Module by issuing its corresponding address on address lines Addr[1-p]. An address decoder 53 monitors address lines Addr[1-p], and issues an appropriate chip select signal (i.e. Chip_Select_1 through Chip_Select_j) to the correspondingly addressed Data Register Module 1 through j.

Each of Data Register Modules 1 through j are substantially similar, and for simplicity only the internal structure of Data Register Module 1 is shown. It is to be understood that the description of Data Register Module 1 is equally applicable to the remaining Data Registers Modules 2 through j.

Each Data Register Module includes a plurality of registers 11$c$_1 to 11$c$_m, and includes an Operation Decode Logic block 55 coupled to monitor at least part of address lines Addr[1-p]. Optionally, Operation Decode Logic block 55 may also monitor selected control signals, such as Write_Select and Read_Select. The logic circuitry of Operation Decode Logic block 55 is preferably configured to determine if a current cpu/mpu cycle is a valid write or read cycle for registers 11$c$_1 to 11$c$_m based on the logic values of the observed address and/or control signals, and further configured to actuate a Write_Valid or Read_Valid signal, as appropriate, based on the determination. Additionally, Operation Decode Logic block 55 is preferably further configured to decode its received address lines to identify and actuate a corresponding signal, Register_Select_1 through Register_Select_m, to select a singularly targeted register from among registers 11$c$_1 through 11$c$_m.

In essence, Operation Decode Logic block 55 decodes the cpu/mpu bus cycle to determine what type of access (read or write) is being requested and whether it is a valid register access. For a valid register write cycle Operation Decode Logic block 55 selects the appropriate register (among registers 11$c$_1 through 11$c$_m) to be written to based on the address. Operation Decode Logic block 55 also outputs the Write_Valid signal to enable the targeted register to be written. Since write data from the cpu/mpu may not be ready at the start of a cycle, the data is written to the register at the end of the cpu/mpu cycle, when the Write_Select signal or Write_Valid signal is negated.

Each of registers 11$c$_1 through 11$c$_m preferably has: a Register_Select input coupled from Operation Decode Logic 55; a plurality of Data_In inputs 1 through n coupled to corresponding data lines Data[1-n] for receiving write data from cpu/mpu 51; a Write_Valid input and a Read_Valid input coupled from Operation Decode Logic 55; a Chip_Select input coming from Address Decoder 53; a Write_Select input and a Read_Select input coupled to receive signals Write_Select and Read_Select from cpu/mpu 51; and a plurality of Data_Out outputs coupled to data bus Data[1-n] for sending read data to cpu/mpu 51. All elements similar to those of FIGS. 1 and 5 have similar reference characters and are described above.

Cpu/mpu 51 initiates a write operation by actuating signal Write_Select, issuing an appropriate address on lines Addr[1-p] for a desired register 11$c$_1 to 11$c$_m within a targeted one of Data Register Modules 1-j, and issuing the write data on lines Data[1-n]. Address decoder 53 resolves the issued address and actuates the Chip_Select signal 1 through j corresponding to the targeted Data Register Module.

Within each Data Register Module, its corresponding Chip_Select signal is shown to be applied to all internal registers 11$c$_1 through 11$c$_m, but the Chip_Select signal may additionally, or alternatively, be applied to Operational Decode Logic 55. If Chip_Select were applied only to Operation Decode Logic 55, then registers 11$c$_1 to 11$c$_m would not respond until their corresponding Register_Select line (1 to m) were actuated by Operation Decode Logic 55.

As shown, data lines Data[1-n], at least part of address lines Addr[1-p], and control lines Write_Select and Read_Select are directly coupled from cpu/mpu 51 to Data Register Modules 1-j. A targeted one of registers 1$c$_1 to 11$c$_m, as determine by an address resolution operation by Operation Decode Logic 55, receives a corresponding actuated Register_Select line. Since in the present embodiment, each Chip_Select line 1 through j is directly coupled between Address Decoder 53 and a corresponding Data Register Modules 1-j, the Data Register Module having an actuated Chip_Select signal responds to the write request, as determined by actuation of the Write_Select line. By waiting until Operation Decode Logic 55 issues the Register_Select signal for the appropriately targeted register within a selected Data Register Module and for Operation Decode Logic 55 to determine wither the current write operation is valid and issues a corresponding Write_Valid signal, the selected Data Register Module provides its registers sufficient time for their Data_In inputs to become valid and for latching in the applied write data. Once the selected register is identified and selected, it then waits until removal of the Write_Select signal or Write_Valid signal before latching in the input data on bus Data[1-n].

A read operation is executed similarly, but cpu/mpu 51 issues the Read_Select signal instead of the Write_Select signal, and the selected register 11$c$_1 through 11$c$_m waits for the Read_Valid signal before outputting its stored data onto data bus Data[1-n]. Basically, Operation Decode Logic 55 selects the register to be read from based on the address issued by cpu/mpu 51. The selected register prepares to output its data contents, but the register's Data_Out outputs are only enabled when its corresponding Chip_Select input and Read_Select input are asserted and Operation Decode Logic 55 is finished decoding a valid read cycle, i.e. has issued the Read_Valid signal.

Figure 10:
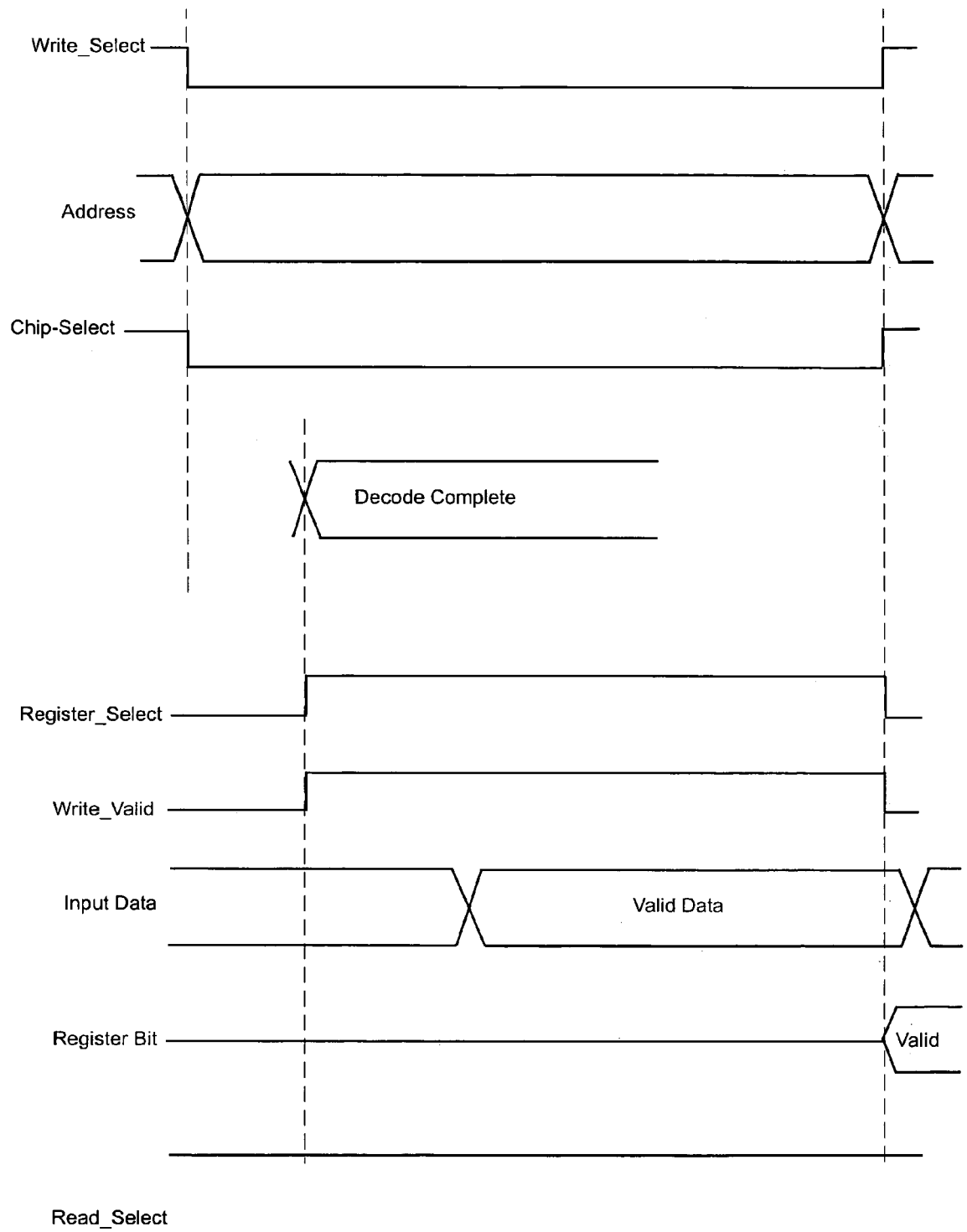
FIG. 10 is a timing diagram for a write operation in accordance with the register of FIG. 9
Figure 12:
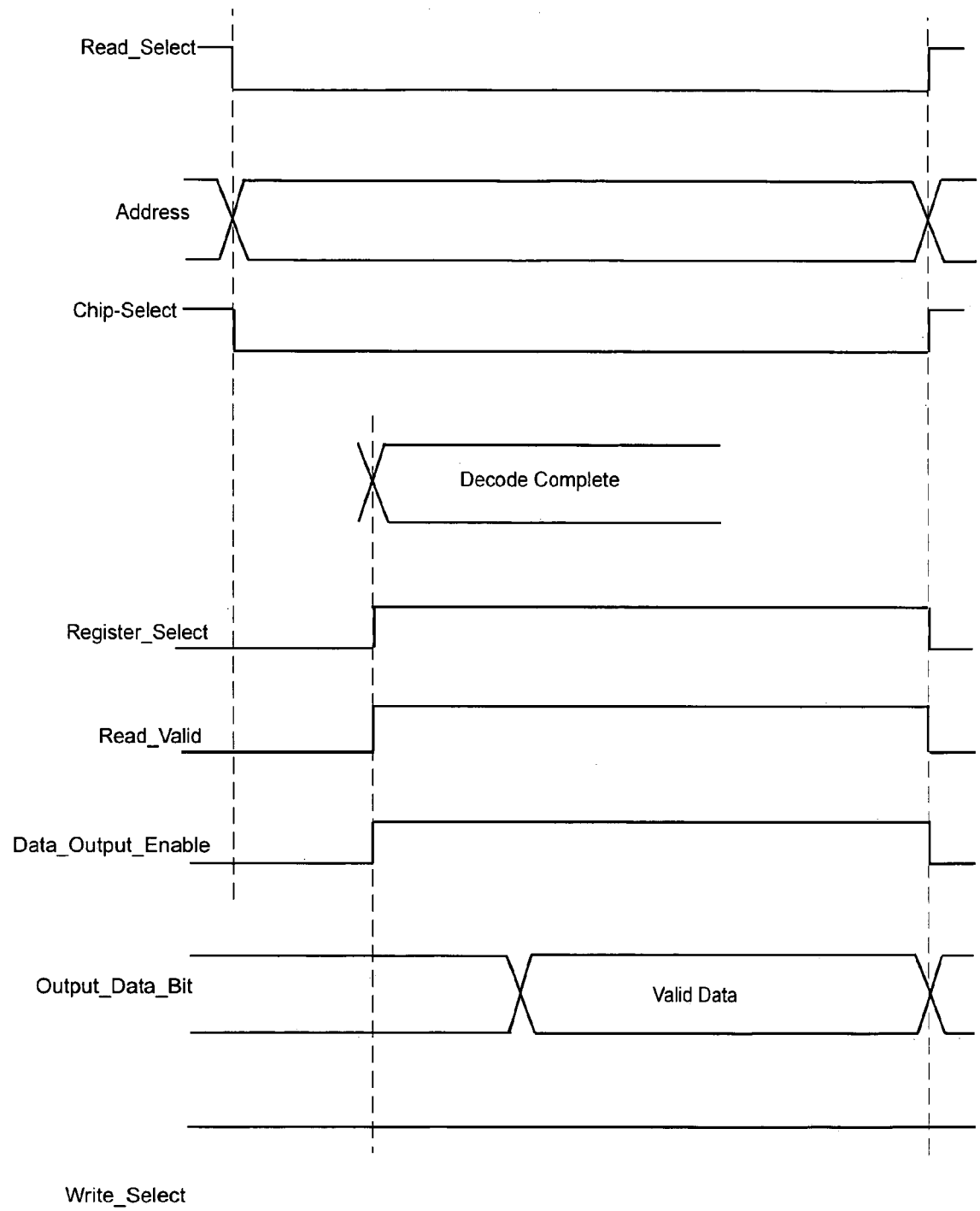
FIG. 12 is a timing diagram for a read operation in accord with the register of FIG. 9.

These processes are better understood with reference to the timing diagrams FIGS. 10 and 12, which respectively show the timing sequences for write and read operations. With reference to FIG. 10 and as explained immediately above, a write operation begins with actuation of signal Write_Select. At this point, the address of a specific data register modules and internal register may be issued. Address Decoder 53 resolves the issued address and actuates the appropriate Chip_Select signal. As explained above, Operation Decode Logic 55 monitors selected bus lines to identify valid write and read operations. Operation Decode Logic 55 may also optionally decode at least part of the issued address to identify a specifically targeted register(s) within the selected Data Register Module, and actuate the Register_Select signal of the appropriately targeted register(s). By this time, Operation Decode Logic 55 would have also determined if the current operation is a valid write operation, and issues the Write_Valid signal, if appropriate. Like before, the current write cycle ends when cpu/mpu 51 negates the Write_Select signal, or when Operation Decode Logic 55 negates the Write_Valid signal or Register_Select signal. The targeted register responds to negation of any of these signals by latching in the current data at its Data_In input, and thereby obtains new, valid register bit information.

Figure 11:
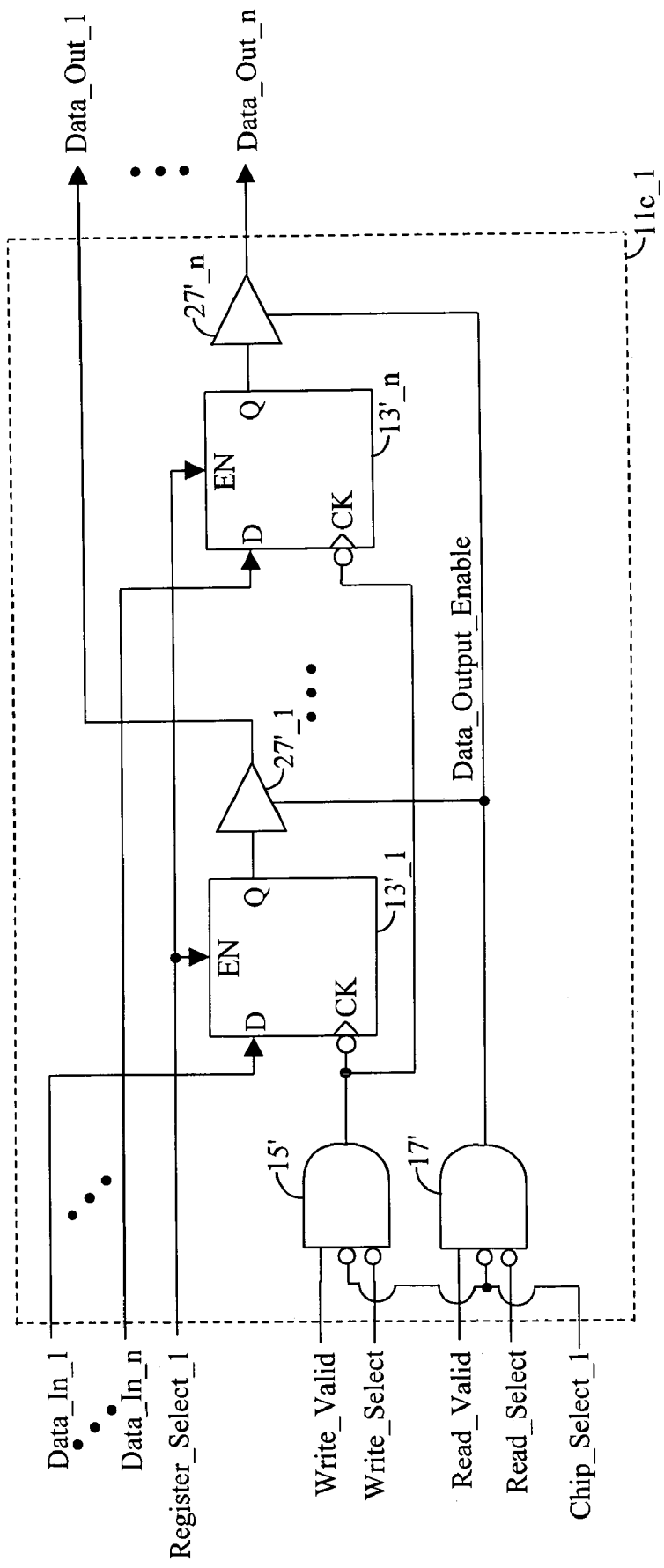
FIG. 11 is an internal view of the register of FIG. 9.

A preferred internal structure of each of Registers 11$c$_1 through 11$c$_m is better understood with reference to FIG. 11, which shows the internal structure of Register 11$c$_1 for illustrative purposes. It is to be understood that the internal structures of the remaining Registers 11$c$_2 through 11$c$_m is substantially similar. All elements similar to those of FIGS. 7 and 4 have similar reference characters with an additional prime symbol, and are described above. In cases where multiple instances of an element are shown, each instance is identified by an underscore followed by a numerical identifier. For example, n data latches 13'_1 through 13'_n (i.e. one data latch for each of inputs Data_in_1 through Data_In_n) are shown coupled to receive a respective one of inputs Data_In_1 through Data_In_n. Similarly, the Q output of each of data latches 13'_1 through 13'_n is coupled to a corresponding one of outputs Data_Out_1 through Data_Out_n via a corresponding one of tri-state buffers 27'_1 through 27'_n. Like in the previous case of FIGS. 4 and 7, the Register_Select input (i.e. Register_Select_1 in the present case) is coupled to the enable input EN of each of data latches 13'_1 through 13'_n.

In the presently preferred embodiment, the chip select input is active low, and input Chip_Select_1 is therefore coupled to an active low input of three-input AND gates 15' and 17'. AND gate 15' responds to a write operation, and has an active low input coupled to receive signal Write_Select and an active high input couple to receive signal Write_Valid. AND gate 17' responds to a read operation, and it has an active low input coupled to receive signal Read_Select and an active high input coupled to receive signal Read_Valid. The output of AND gate 15' is couple to the negative edge-triggered clock input of data latches 13'_1 through 13'_n. In this way, AND gate 15' triggers latches 13'_1 through 13'_n to accept new data in unison from their respective Data_In_1 through Data_In_n inputs upon a transition from high to low of at the output of AND gate 15'. The output of AND gate 17' controls tri-state buffers 27'_1 through 27'_n in unison.

With reference to FIG. 12, the read sequence of the register 11$c$_1 of FIG. 11 begins when cpu/mpu 51 actuates signal Read_Select and issues an address identifying a specific register within a selected Data Register Module. Upon resolving the issued address, Address Decoder 53 actuates the Chip_Select input of the selected Data Register Module. Once the Operation Decode Logic 55 of the selected Data Register Module has identified the specific register within the selected Data Register Module, it will issue the Register_Select signal of the identified register. Upon determining that the current operation is a valid read operation, the Operation Decode Logic 55 will also issue signal Read_Valid.

D latches 13'_1 through 13'_n are activated in response to a high value on signal Register_Select. AND gate 17' responds to a low value on signals Chip_Select and Read_Select and a high value on signal Read_Valid by actuating signal Data_Out_Enable. As a result, tri-state buffers 27'_1 through 27'_n couple the Q output of each of D latches 13'_1 through 13'_n to their corresponding output, Data_Out_1 through Data_Out_n. As shown in FIG. 12, this provides valid data at each Output_Data_Bit.

Since register access operations of the present invention can be completed in one cpu/mpu bus clock cycle, several performance limiting features of the prior art are eliminated. For example, the present high performance register access method eliminates the need for a wait signal, which was previously output by a register, or memory, device to let the cpu/mpu know when to end a current cycle. Consequently, register access cycles are only limited by the speed of the cpu/mpu bus cycle, and not limited by the speed of the register device. Additionally since the present method makes use of combinatorial logic, the present invention saves power and space because no clock is required to access a register block.

Furthermore, if a write buffer is implemented on a cpu/mpu device, the write buffer will not be necessary for register write cycles and can be used more efficiently for concurrent memory write cycles to another memory module, thereby increasing the throughput to the device. That is, while the write buffer holds data being written to another memory module, the cpu/mpu can output data for a current write operation to a register in accord with the present invention since the write data does need to be held for multiple bus cycles.

Additionally, a true power save mode can be implemented where all clocks in an electronic device can be shut off by writing to a particular register in accord with the present invention. The clocks can be turned back on again by writing to the same register. Since the register in accord with the present invention does not need a bus clock, the device clock does not need to be running in order to write to the register in order to enable and disable a power save mode.

The present invention has been described in connection with various preferred embodiments thereof with reference to the accompanying drawings. However, various changes and modifications will be apparent to those skilled in the art based on the foregoing description. Such changes and modifications are intended to be included within the scope of the present invention to the extent they fall within the scope of the appended claims.

What is claimed is:

1. A data register comprising:
   a data input;
   a data output;
   a Write_Select input;
   a Write_Valid input;

a Read_Select input;
a Read_Valid input;
wherein said Write_Select input is a first control input effective for selectively placing said data register in a write mode of operation in response to a first logic signal if said Write_Valid input is actuated, and said data register disregards said Write_Select input if said Write_Valid input is not actuated;
wherein said Read_Select input is a second control input effective for placing said data register in a read mode of operation in response to a second logic signal if said Read_Valid input is actuated, and said data register disregards said Read_Select input if said Read_Valid input is not; and
wherein when in said write mode, said data register latches in new data applied to said data input upon the removal of said first logic signal from said Write Select input.

2. The data register of claim 1, further having a lack of a clock input.

3. The data register of claim 1, wherein:
said data register is placed in said write mode of operation in response to said first logic signal being at a first logic state; and
said data register is placed in said read mode of operation in response to said second logic signal being at said first logic state.

4. A data register comprising:
a data input;
a data output;
a Write Select input;
a Write Valid input;
a Read Select input;
a Read Valid input;
wherein said Write Select input is a first control input effective for selectively placing said data register in a write mode of operation in response to a first logic signal if said Write Valid input is actuated, and said data register disregards said Write Select input if said Write Valid input is not actuated;
wherein said Read Select input is a second control input effective for placing said data register in a read mode of operation in response to a second logic signal if said Read Valid input is actuated, and said data register disregards said Read Select input if said Read Valid input is not actuated;
a first AND gate responsive to said Write_Valid input and to said Write_Select input, and effective producing a first control output;
a second AND gate responsive to said Read_Valid input and to said Read_Select input, and effective for producing a second control output;
a data latch having a data_in node coupled to said data input, a clock_in node coupled to said first control output, and a data_out node; and
a signal-pass device effective for selectively coupling said data_out node to said data output in response to said second control output.

5. The data register of claim 4, wherein:
said first AND gate has a first active high input responsive to said Write_Valid input and a first active low input responsive to said Write_Select input; and
said second AND gate has a second active high input responsive to said Read_Valid input and a second active low input responsive to said Read_Select input.

6. A data register comprising:
a data input;
a data output;
a Write Select input;
a Write Valid input;
a Read Select input;
a Read Valid input;
wherein said Write Select input is a first control input effective for selectively placing said data register in a write mode of operation in response to a first logic signal if said Write Valid input is actuated, and said data register disregards said Write Select input if said Write Valid input is not actuated;
wherein said Read Select input is a second control input effective for placing said data register in a read mode of operation in response to a second logic signal if said Read Valid input is actuated, and said data register disregards said Read Select input if said Read Valid input is not actuated;
wherein the operation of said data register follows a two phase sequence consisting of a get ready phase followed by an execution phase;
wherein during a write operation said execution phase consists of latching in input data; and
upon application of said first logic signal at said Write_Select input, said data register will not enter the get ready phase until actuated of said Write_Valid input.

7. The data register of claim 6, wherein said data register initiates the latching in of data of the execution phase of said write operation upon the removal of said first logic signal from said Write_Select input.

8. The data register of claim 6, wherein said data register initiates the latching in of data of the execution phase of said write operation upon the removal of said Write_Valid signal.

9. A register access system, comprising:
A) a data processing unit having;
  i) data output nodes;
  ii) address output nodes;
  iii) a Write_Select output for initiating a write operation;
  iv) a Read_Select output for initiating a read operation;
B) a data bus coupled to said data output node;
C) an address bus coupled to said address output nodes;
E) at least one data register module coupled to said data bus, address bus, Write_Select output and Read_Select output, each data register module including:
  1) at least one register_latch bank;
  2) an operation decode logic circuit for controlling access to each register_latch bank, said operation decode logic having a Register_Select output node for selecting a specific one of said register_latch banks, a Write_Valid output node for issuing a Write_Valid signal during a valid write operation, and a Read_Valid output node for issuing a Read_Valid signal during a valid read operation;
wherein each register_latch bank includes:
  a data input node coupled to a predetermined data line on said data bus;
  a data output node coupled to said predetermined data line on said data bus;
  a Register_Select input node coupled to said Register_Select output node;
  a Write_Select input node responsive to said Write_Select output;
  a Write_Valid input node responsive to said Write_Valid signal;

a Read_Select input node responsive to said Read_Select output;

a Read_Valid input node responsive to said Read_Valid signal;

wherein said Write_Select input node is effective for selectively placing said register_latch bank in a write mode of operation in response to said Write_Valid signal being issued, and said register_latch bank disregards said Write_Select input if said Write_Valid signal is not issued; and wherein said Read_Select input node is effective for placing said register_latch bank in a read mode of operation in response to said Read_Valid signal being issued, and said register_latch bank disregards said Read_Select input node if said Read_Valid signal is not issued.

10. The register access system of claim 9, further comprising;

F) an address decoder coupled to receive said address bus and having a separate chip_select output per data register module, said address decoder being effective for identifying a specifically targeted data register module as determined from said address bus, and for and actuating the chip_select output corresponding to the targeted data register module;

wherein each data register module further has a first chip_select input couple to its corresponding chip_select output, and effective for being placed in an active mode in response to actuation of its corresponding chip_select input.

11. The register access system of claim 9, wherein said operation decode logic circuit is effective for differentiating between a valid and an invalid register write cycle, for differentiating between a valid and an invalid register read cycle, for actuating its Write_Valid output node when detecting a valid register write cycle, and for actuating its Read_Valid output when detecting a valid register read cycle.

12. The register access system of claim 11, wherein each data register module further has an address select input coupled to at least part of said address bus, and the determination of a valid write or read operation by said operation decode logic circuit is based at least partially on the data contents of said address select input.

13. The register access system of claim 9, wherein each register_latch bank lacks a clock input.

14. The register access system of claim 9, wherein said register_latch bank is placed out of said write mode of operation in response to said Write_Select input node receiving a complementary signal; and said data register is placed out of said read mode of operation in response to a said Read_Select input receiving said complementary signal.

15. The register access system of claim 9, wherein said register_latch bank is placed in said write mode of operation in response to said Write_Select input node being at a first logic state; and said data register is placed in said read mode of operation in response to said Read_Select input node being at said first logic state.

16. The register access system of claim 9, wherein said register_latch bank, further includes;

a first AND gate responsive to said Write_Valid input node and to said Write_Select input node, and effective producing a first control output;

a second AND gate responsive to said Read_Valid input node and to said Read_Select input node, and effective for producing a second control output;

one data latch per data_in input node, each having a latch_input node coupled to it corresponding data_in input node and a latch_output selectively coupled to its corresponding data_out output node, and a clock_in node coupled to said first control output; and one signal-pass device per data latch effective for selectively coupling it corresponding data latch's latch_out node to the latch's corresponding data output node in response to said second control output;

wherein said first AND gate has a first active high input responsive to said Write_Valid input node and a first active low input responsive to said Write_Select input node; and wherein said second AND gate has a second active high input responsive to said Read_Valid input node and a second active low input responsive to said Read_Select input node.

17. The register access system of claim 9, wherein when in said write mode of operation, said register_latch bank latches in new data applied to said data_in input node input upon said Write_Select output node ceasing to be actuated.

18. The register access system of claim 9, wherein the operation of said register_latch bank follows a two phase sequence consisting of a get ready phase followed by an execution phase;

wherein during a write operation said execution phase consists of latching in input data; and upon actuation of said Write_Select input node, said register_latch bank will not enter the get ready phase until actuation of said Write_Valid input node.

19. The register access system of claim 18, wherein said register_latch bank initiates the latching in of data of the execution phase of said write operation upon said Write_Select input node ceasing to be actuated.

20. The register access system of claim 18, wherein said register_latch bank initiates the latching in of data of the execution phase of said write operation upon the removal of said Write_Valid signal.

21. The register access system of claim 18, wherein said register_latch enters the get-ready phase of the read operation in response to actuation of said Read_Select input node, and initiates a read operation as said execution phase actuation of Read_Valid input node.

* * * * *